(12) United States Patent
Yoon et al.

(10) Patent No.: US 6,660,318 B2
(45) Date of Patent: Dec. 9, 2003

(54) METHOD FOR MANUFACTURING CANDY HAVING A STEREOSCOPIC PICTURE USING THEREOF

(75) Inventors: Jeong-Min Yoon, Anyang-si (KR); Byong Kwon Park, Anyang-si (KR)

(73) Assignee: Jeong Min Yoon (KR)

( * ) Notice: Subject to any disclaimer, the term of this patent is extended or adjusted under 35 U.S.C. 154(b) by 0 days.

(21) Appl. No.: 10/049,748

(22) PCT Filed: May 8, 2001

(86) PCT No.: PCT/KR01/00738
§ 371 (c)(1),
(2), (4) Date: Jun. 5, 2002

(87) PCT Pub. No.: WO01/84946
PCT Pub. Date: Nov. 15, 2001

(65) Prior Publication Data
US 2003/0091723 A1 May 15, 2003

(30) Foreign Application Priority Data
May 8, 2000 (KR) .......................... 2000/24348

(51) Int. Cl.[7] .................................. A23G 3/00
(52) U.S. Cl. ................... 426/383; 426/87; 426/104; 426/515; 426/134; 426/421
(58) Field of Search .................... 426/87, 383, 515, 426/104, 134, 421

(56) References Cited

U.S. PATENT DOCUMENTS

| | | | | |
|---|---|---|---|---|
| 328,867 A | * | 10/1885 | Van Leeuwen | |
| 1,502,006 A | * | 7/1924 | Alvord | |
| 1,777,896 A | * | 10/1930 | Rossi | |
| 2,469,589 A | * | 5/1949 | Barricini | |
| 2,895,832 A | * | 7/1959 | Bersey | |
| 3,062,662 A | * | 11/1962 | McDonald | |
| 3,258,347 A | * | 6/1966 | Brown | |
| 3,666,388 A | * | 5/1972 | Oberwelland et al. | |
| 3,809,774 A | * | 5/1974 | Raitt | |
| 3,852,494 A | * | 12/1974 | Williamson | |
| 3,961,089 A | * | 6/1976 | Dogliotti | |
| 4,014,156 A | * | 3/1977 | Klahn et al. | |
| 4,278,022 A | * | 7/1981 | Fitzpatrick | |
| 4,455,320 A | * | 6/1984 | Syrmis | |
| 5,002,775 A | * | 3/1991 | Toya et al. | |
| 5,066,502 A | * | 11/1991 | Eales | |
| 5,279,842 A | * | 1/1994 | Gallart et al. | |
| 5,413,472 A | * | 5/1995 | Dietterich | |
| 5,800,601 A | * | 9/1998 | Zou et al. | |
| 5,834,047 A | * | 11/1998 | Ahn | |
| 6,084,619 A | * | 7/2000 | Takemoto et al. | |

FOREIGN PATENT DOCUMENTS

| | | | | |
|---|---|---|---|---|
| EP | 447733 | * | 9/1991 | ................. 426/104 |
| EP | 462093 | * | 12/1991 | |
| FR | 2213022 | * | 8/1974 | ................. 426/383 |
| GB | 838948 | * | 6/1960 | ................. 426/383 |
| GB | 2139337 | * | 11/1984 | |
| JP | 47-16093 | * | 5/1972 | ................. 426/383 |
| JP | 61-35748 | * | 2/1986 | ................. 426/104 |
| JP | 62-36151 | * | 2/1987 | ................. 426/383 |
| JP | 62-220150 | * | 9/1987 | ................. 426/91 |
| JP | 1-178564 | * | 7/1989 | ................. 426/87 |
| SE | 170922 | * | 3/1960 | ................. 426/104 |

* cited by examiner

Primary Examiner—Steve Weinstein
(74) Attorney, Agent, or Firm—Anderson Kill & Olick, P.C.; Eugene Lieberstein; Michael N. Meller

(57) ABSTRACT

This invention is a method for manufacturing candy using a first and second mold, which comprises the steps of filling a measured amount of the first mixture comprising raw materials for candy and additives into the first mold, partially cooling said mixture, printing a desired picture onto the partially cooled mixture by using one or more compositions selected among red, blue, and yellow edible ink compositions, filling a measured amount of the second mixture comprising raw materials for candy and additives into the second mold, partially cooling the first arid second mixture, joining the first mold and the second mold to combine the first mixture and the second mixture by pressing the joint pin, and hardening the mixture of the mold to form the candy product from the mold.

3 Claims, 3 Drawing Sheets

METHOD FOR MANUFACTURING CANDY HAVING A STEREOSCOPIC PICTURE USING THEREOF

This application is a 371 of PCT/KR01/00738 filed may 8, 2001

FIELD OF THE INVENTION

The present invention relates to a symmetrical mold for manufacturing a candy and methods for manufacturing a candy having a stereoscopic picture using thereof. More particularly, it relates to a symmetrical mold for manufacturing a candy and methods for manufacturing a candy, in which a picture having various colors and shading are printed clearly and stereoscopically by using the mold and new edible ink compositions.

BACKGROUND OF THE INVENTION

FIG. 1 is a flow chart of a conventional depositing process for manufacturing a stick candy printed a picture therein. The process for manufacturing a stick candy of FIG. 1 is described in detail as follows:

The starting materials (A) such as sugar, starch syrup, water, and the like, are introduced and blended in the dissolver 1. The mixture is moved to a cooker 2 and is concentrated to be a desired viscosity. A stick is then introduced into a mold by a stick injecting means 3. The concentrated mixture (B) is introduced and blended together with conventional additives (C) such as flavors, coloring agents, etc. in a hopper 4. The mixture with a measured amount is poured into the mold from the first depositor 5, which is mounted under the hopper 4. After filling, the mixture is partially cooled by passing through a first condenser 6, and then printed a desired picture thereon by a printer 7. The concentrated ingredients (B) and additives (C) are secondly introduced in a hopper 8. Following introduction, the mixture with a measured amount is loaded on the first mixture from a second depositor 9, which is mounted under the hopper 8. The mixture hardened by a second condenser 10 is separated from the mold, and then the candy printed a picture therein is obtained.

FIG. 2a is a cross-sectional view of a conventional mold, in which the candy mixture is filled according to the conventional depositing process, and FIG. 2b is plan views of conventional molds with various shapes such as ice cream, rabbit, and bear. As shown in FIG. 2a, the conventional depositing process utilizes a single mold which cannot be separated. Therefore, the bottom shape of the first mixture 22 can be varied as desired, but the top shape of the second mixture 23 cannot be formed. In FIG. 2a, the member 25 shows a stick.

Furthermore, an image 24, which is printed on the candy according to the conventional depositing technologies, is restricted to only a simple one. On considering physical properties of candy and its manufacturing process, printing of an image into a candy is different from printing on a hard material such as a paper, plastic, etc. In general, after hard vessel and products are produced, the pictures may be printed thereon. While, in case of candy printing, the printed pictures may be deformed by the difference of temperature at the filling step and cooling step in the manufacturing process, since the pictures are printed on the candy during processing not on the final candy product. As a result, distinct pictures with a high resolution may not be obtained.

Generally, the sharpness of printed pictures may be determined by controlling process conditions of candies. If the cooling time of the mixture after the first filling becomes long, the workability of the cooled mixture is deteriorated, and if a variation of the temperature existing between the first filling and the second filling is too high, the sharpness of printed pictures is impaired.

Also, only simple colors are expressed by conventional edible inks, whereby various and natural pictures such as photograph may not be expressed on the candy.

Therefore, there is a need in the art to provide new method, by which detailed, high-resolution, and high-quality images are applied to a candy. So the present inventor has developed a symmetrical mold, which may express both sides of the candy stereoscopically, and optimum conditions for processing the candy and edible ink compositions. According to the present invention, it is possible to prepare candies having various shapes, which could not be produced by the conventional method. Proper combination of the mold, the ink compositions, and manufacturing conditions according to the present invention allows a candy to have a highly pleasing image therein.

In the context of this application, 'picture' or 'image' is construed broadly to include photograph, character, drawing, etc., and 'candy' is also construed broadly to include various confectionary products such as hard candy and soft candy (e.g. jelly, marshmallow, chocolate). It is to be understood that other specific element also includes all technical equivalents which operate in a similar manner to accomplish a similar purpose.

DETAILED DESCRIPTION OF THE INVENTION

The present invention provides a symmetrical mold for preparing a stereoscopic candy, which comprises a first mold having a desired shape and a second mold which is symmetrical to said first mold, wherein the first mold may be joined with the second mold to form a stereoscopic candy product. The first mold has a joint pin to join the contents of the first and second molds, and said joint pin is also useful for separating the contents from the mold. Alternatively, a tube for inserting a stick in the candy may be equipped in the first mold in order to manufacture a stick candy. The first mold and the second mold have a symmetrical arrangement to join together after filling, and both molds have independently desired shaped, inner surface structures. The inner surface structures of both molds may be either symmetrical or asymmetrical according to the external shape of the final candy product.

Also, the present invention provides methods for manufacturing a candy having a stereoscopic picture therein using the symmetrical mold.

The preferred embodiment of the present invention is as follows: filling a measured amount of the first mixture consisting of raw material for candy and additives from the first depositor in the first mold, while the temperature of the first mixture is maintained at about 130 to 150.degree. C. during the procedure; partially cooling the first mixture to about 60 to 80.degree. C.; printing a desired picture onto the partially cooled mixture by using one or more compositions among red, blue, and yellow edible ink compositions; filling a measured amount of the second mixture consisting of raw materials for candy and additives from the second depositor in the second mold, while the temperature of the second mixture is maintained at about 120 to 130.degree. C.; partially cooling the first and second mixture to slightly higher than ambient temperature; joining both molds to combine the first mixture and the second mixture by pressing a joint pin; and cooling the mixture to obtain the final product.

The raw materials for candy include conventional ingredients such as sugar, starch syrup, and water, and the additives include conventional additives such as flavors, and coloring agent. The components of the first mixture and the second mixture may be the same or different as desired. The invention is not limited to the above materials, but any conventional raw materials and additives may be used to effect the process of the present invention.

FIG. 3 is a flow chart of a process for manufacturing candies printed a stereoscopic picture therein by using a symmetrical mold according to the present invention. The symmetrical mold comprises a first mold 31, in which the raw material for candy is fed from a first depositor 34, and a second mold 32, in which said raw material is fed from a second depositor 35. There is a joint pin 33 for separating easily the contents in the mold.

In one embodiment of the present invention, a stick may be previously provided through a stick feeding tube of the first mold before the candy mixture is filled into the first mold.

For preparing a candy having a high-resolution image, it is important to regulate the temperature of the mixture in both filling and cooling steps. To prevent a printed picture from deforming resulting from a difference of temperature between the first filling and the second filling, the temperature of the mixture on first filling is preferred to maintain about 130 to 150.degree. C., and that of the mixture on second filling is preferred to maintain lower than that of the first filling, i.e. about 120 to 130.degree. C. The cooling temperature of the mixture after first filling is preferred about 60 to 80.degree. C. to be printed a picture clearly. The both mixtures after second filling may be partially cooled at the temperature slightly greater than ambient temperature to combine each other. The temperature of the mixtures is preferred about 20 to 40.degree. C., and it is more preferred about 25 to 35.degree. C. It should be understood that the first candy mixture and/or the second candy mixture is transparent.

For printing a high-resolution image in the candy, it is preferable to use one or more compositions among red, blue, and yellow edible ink compositions of the present invention. The number of colors on printing may be easily determined by the skilled in the art according to the picture to be printed. The components and their amounts of the edible ink compositions are shown below. It is possible to show a picture clearly with various colors and shadings by using said edible ink compositions and controlling temperature of each steps. All of the percent are based on volume.

| Edible ink composition | |
|---|---|
| 1. Blue ink | |
| Ethanol | 70–88% |
| Shellac | 1–8% |
| Carnauba wax | 0.1–3% |
| Blue No. 1 aluminum lake (Brilliant Blue FCF) | 0.1–3% |
| 2. Yellow ink | |
| Ethanol | 70–88% |
| Shellac | 1–10% |
| Carnauba wax | 0.1–5% |
| Yellow No. 4 aluminum lake (Tartrazine) | 0.1–5% |
| 3. Red ink | |
| Ethanol | 70–85% |
| Shellac | 1–10% |
| Carnauba wax | 0.1–5% |
| Red No. 40 aluminum lake (Allura red AC) | 0.1–3% |

Among the above compositions, Blue No. 1 aluminum lake, Yellow No. 4 aluminum lake, and Red No. 40 aluminum lake are called as FD & C blue No. 1, FD & C yellow No. 5, and FD & C red No. 40 in America, and as E133, E102, and E129 in Europe, respectively.

PREFERRED EMBODIMENT OF THE INVENTION

Figure 1:
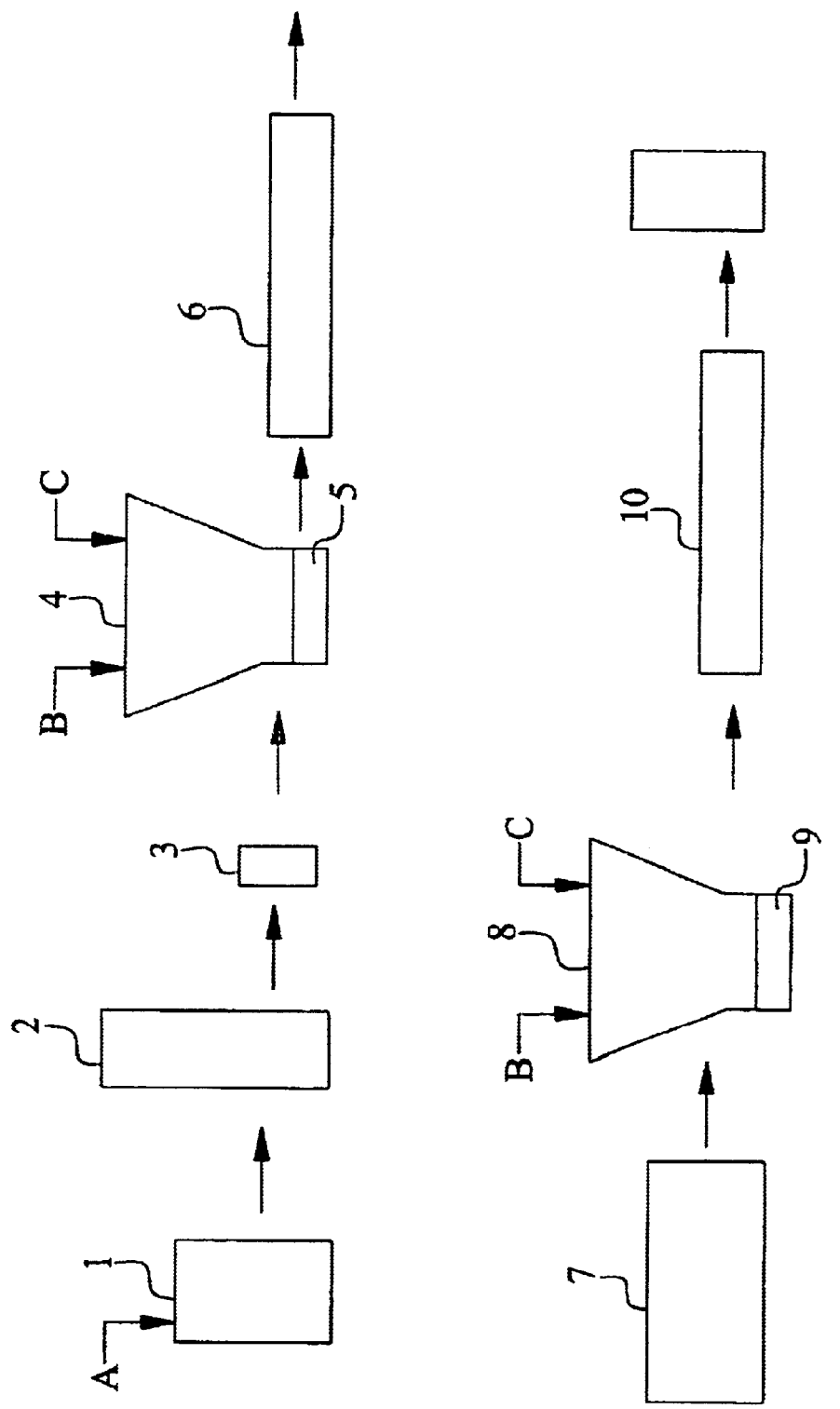
FIG. 1 is a flow chart of a conventional depositing process for manufacturing a stick candy printed a picture therein.
Figure 2A:
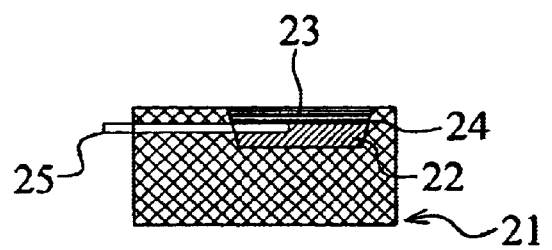
FIG. 2a is a cross-sectional view of a conventional mold, in which the candy mixture is filled according to the conventional depositing process.
Figure 2B:
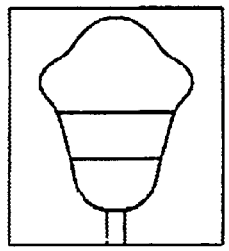
FIG. 2b is plan views of conventional molds with various shapes of ice cream, rabbit, and bear.
Figure 2B:
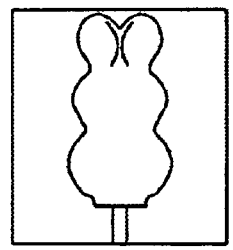
Figure 2B:
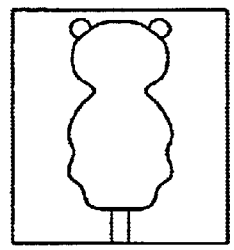
Figure 3:
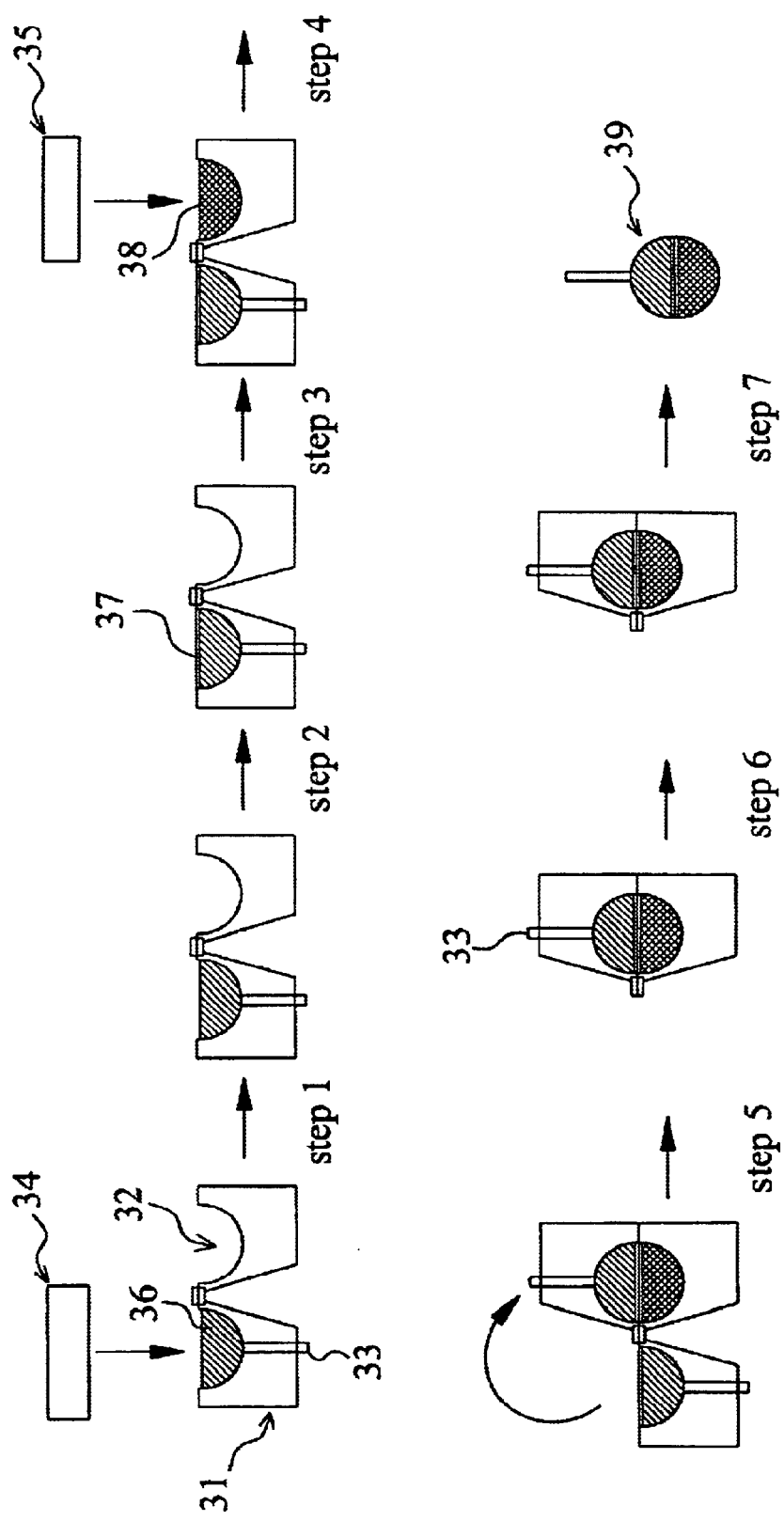
FIG. 3 is a flow chart of process for manufacturing candy printed a stereoscopic picture therein by using a symmetrical mold according to the present invention.

A preferred embodiment of process for manufacturing a candy of the present invention is described by referring to FIG. 3.

According to the present invention, a stereoscopic candy printed a picture therein may be produced by using a symmetrical mold with various shapes on its both sides as shown in FIG. 3. In FIG. 3, the mold has a symmetrical arrangement between the first mold 31 and the second mold 32. And, the first mold has a joint pin 33 to join the contents of the first and the second mold and to separate easily the candy formed from the mold by pressing said joint pin.

Optionally, a stick may be inserted in the first mold 31 by a stick injecting means, which is not showed in FIG. 3. The first mixture 36, which comprises dissolved and concentrated raw materials for candy such as sugar, starch syrup, and water, etc., and other additives such as flavors and coloring agent, are introduced and blended in the first depositor 34. The mixture with a measured amount is filled in the first mold 31 from the first depositor 34, while the temperature of the mixture is maintained at about 130 to 150.degree. C. (Step 1). The first mixture is partially cooled to about 60 to 80.degree. C. by a condenser (Step 2). A desired picture 37 is printed on the cooled mixture by using one or more compositions among red, blue, and yellow edible ink compositions (Step 3). The second mixture 38, which comprises dissolved and concentrated raw materials for candy such as sugar, starch syrup, and water, etc., and other additives such as flavors and coloring agent, are introduced and blended in the second depositor 35. The mixture with a measured amount is filled in the second mold 32 from the second depositor 35, while the temperature of said mixture is maintained at about 120 to 130.degree. C. (Step 4). The first and second mixture is partially cooled to about 20 to 40.degree. C. The first mold 31 and the second mold 32 join together (Step 5). The first mixture 36 is combined with the second mixture 38 by pressing a joint pin 33 (Step 6). After the mixture of the mold is hardened, the final product 39 printed a high-resolution picture therein may be obtained by pressing the joint pin (Step 7).

In FIG. 3, it can be shown that the first mold and the second mold are joined together in Step 5. The first mold and the second mold have a symmetrical arrangement to join together, but inner structure of both molds may be either symmetrical or asymmetrical according to the external shape of the final product.

Modifications and variations of the above embodiment of the present invention are possible, as appreciated by those skilled in the art.

Although the invention has been described with respect to a specific preferred embodiment for a complete and clear disclosure, the appended claims are not to be thus limited but are to be construed as embodying all modifications and alternative constructions that may occur to one skilled in the art and which fairly fall within the basic teaching therein set forth.

What is claimed is:

1. The method for manufacturing candy using a first mold and a second mold which comprises:

filling a measured amount of a first heated mixture comprising raw materials for candy and additives into the first mold;

partially cooling said first heated mixture sufficient to allow the printing of a clear picture;

printing a desired picture onto the partially cooled first mixture by using one or more compositions selected among red, blue, and yellow edible ink compositions;

filling a measured amount of a second heated mixture comprising raw materials for candy and additives into the second mold;

further partially cooling the first printed mixture and partially cooling the second mixture so that said mixtures are slightly higher than ambient temperature and sufficient to combine the two mixtures;

joining the first mold and the second mold to combine the first further partially cooled mixture and the partially cooled second mixture such that the second mixture physically contacts and adheres to both the first mixture and to said printed picture such that the picture is encased between the two mixtures; and then hardening the mixture of the mold to form the candy product from the mold.

2. The method for manufacturing candy of claim 1, wherein the temperature of the first mixture during its filling is maintained at about 130 to 150.degree. C.; the temperature of the first mixture for printing after its cooling is about 60 to 80.degree. C.; the temperature of the second mixture during its filling is maintained at about 120 to 130 degree C.; and the temperature sufficient to combine the two mixtures is about 20 to 40.degree. C.

3. The method for manufacturing candy of claim 1, wherein said printing is conducted by using one or more edible ink compositions selected from red, yellow, and blue ink compositions, wherein said blue edible ink composition comprises 70 to 88% by volume of ethanol, 1 to 8% by volume shellac, 0.1 to 3% by volume of carnauba wax, and 0.1 to 3% by volume of blue No. 1 aluminum lake; said yellow edible ink compositions comprises 70 to 88% volume of ethanol, 1 to 10% by volume shellac, 0.1 to 5% by volume of Carnauba wax, and 0.1 to 5% by volume of yellow No. 4 aluminum lake; and said red edible ink composition comprises 70 to 85% by volume of ethanol, 1 to 10% by volume shellac, 0.1 to 5% by volume of carnauba wax, and 0.1 to 3% by volume of red No. 40 aluminum lake.

* * * * *